(12) United States Patent
Knapp

(10) Patent No.: US 8,881,472 B2
(45) Date of Patent: Nov. 11, 2014

(54) MOUNTING DEVICE AND METHOD OF INSTALLING OF A SOLAR PANEL

(71) Applicant: Cel-F Solar Systems Limited, Kent (GB)

(72) Inventor: Kevin Knapp, Kent (GB)

(73) Assignee: Cel-F Solar Systems Limited (GB)

( * ) Notice: Subject to any disclaimer, the term of this patent is extended or adjusted under 35 U.S.C. 154(b) by 0 days.

(21) Appl. No.: 13/790,706

(22) Filed: Mar. 8, 2013

(65) Prior Publication Data

US 2013/0318893 A1  Dec. 5, 2013

Related U.S. Application Data

(63) Continuation-in-part of application No. PCT/GB2011/051685, filed on Sep. 8, 2011.

(30) Foreign Application Priority Data

Sep. 9, 2010 (GB) .................................. 1015019.1

(51) Int. Cl.
| | |
|---|---|
| E04D 13/18 | (2014.01) |
| H01L 31/042 | (2014.01) |
| H01L 31/048 | (2014.01) |
| F24J 2/52 | (2006.01) |
| F24J 2/46 | (2006.01) |

(52) U.S. Cl.
CPC ........ *F24J 2/5245* (2013.01); *F24J 2002/5292* (2013.01); *F24J 2/526* (2013.01); *H01L 31/0422* (2013.01); *F24J 2/5237* (2013.01); *Y02B 10/20* (2013.01); *F24J 2/5252* (2013.01); *F24J 2002/4658* (2013.01); *Y02B 10/12* (2013.01); *Y02E 10/47* (2013.01); *F24J 2002/5284* (2013.01); *Y02E 10/50* (2013.01); *H01L 31/0484* (2013.01); *H01L 31/0424* (2013.01)
USPC ...... 52/173.3; 52/460; 52/506.03; 52/506.08; 52/765; 52/475.1; 126/623

(58) Field of Classification Search
USPC ......... 52/173.3, 745.21, 460, 506.03, 506.06, 52/506.08, 506.09, 765, 766; 248/237, 248/910, 346.03; 126/621, 623; 136/251, 136/244
See application file for complete search history.

(56) References Cited

U.S. PATENT DOCUMENTS 6,170,212 B1 * 1/2001 Suchyna et al. ................ 52/480
6,809,251 B2 * 10/2004 Dinwoodie .................... 136/251
(Continued)

FOREIGN PATENT DOCUMENTS

DE  20 2010 003418   6/2010
EP  1585873   10/2005
(Continued)

OTHER PUBLICATIONS

International Search Report and Written Opinion issued in PCT Application No. PCT/GB2011/051685, mail date Jun. 4, 2012.

(Continued)

*Primary Examiner* — Chi Q Nguyen
(74) *Attorney, Agent, or Firm* — Fulbright & Jaworski LLP

(57) ABSTRACT

A solar panel mounting anchor adapted for mounting a solar panel on a flat roof, the anchor comprising integral ballast, and edges comprising a resilient material and at least one engagement feature adapted to receive a solar panel and to space the panel from said roof, and a base adapted to inhibit slipping of the anchor on said roof. Preferably the integral ballast is such that the mass of the anchor is at least 15 kg.

15 Claims, 19 Drawing Sheets

(56) References Cited

U.S. PATENT DOCUMENTS

| | | | |
|---|---|---|---|
| 7,307,209 B2* | 12/2007 | Mapes et al. | 136/251 |
| 7,434,362 B2* | 10/2008 | Liebendorfer | 52/173.3 |
| 7,607,619 B2* | 10/2009 | Smart et al. | 248/74.1 |
| 8,156,697 B2* | 4/2012 | Miros et al. | 52/173.3 |
| 8,272,176 B2* | 9/2012 | Wallgren | 52/173.3 |
| 8,443,558 B2* | 5/2013 | Buller et al. | 52/173.3 |
| 8,522,491 B2* | 9/2013 | Kneip et al. | 52/173.3 |
| 8,567,132 B2* | 10/2013 | Rothschild et al. | 52/173.3 |
| 2003/0094193 A1* | 5/2003 | Mapes et al. | 136/244 |
| 2004/0250491 A1* | 12/2004 | Diaz et al. | 52/518 |
| 2005/0229924 A1 | 10/2005 | Luconi et al. | 126/696 |
| 2006/0266352 A1 | 11/2006 | Marston et al. | 126/621 |
| 2007/0212935 A1* | 9/2007 | Lenox | 439/567 |
| 2010/0175337 A1 | 7/2010 | Mascolo et al. | 52/173.3 |

FOREIGN PATENT DOCUMENTS

| | | |
|---|---|---|
| EP | 2257992 | 12/2010 |
| FR | 2 939 242 | 6/2010 |
| NL | 1029160 | 12/2006 |
| WO | WO 2004/063485 | 7/2004 |
| WO | WO 2006/116398 | 11/2006 |
| WO | WO 2009/120923 | 10/2009 |

OTHER PUBLICATIONS

Search Report Issued in Great Britain Application No. GB1015019.1, mail date Jan. 1, 2011.

* cited by examiner

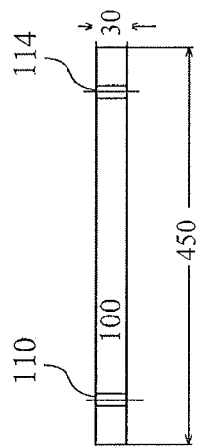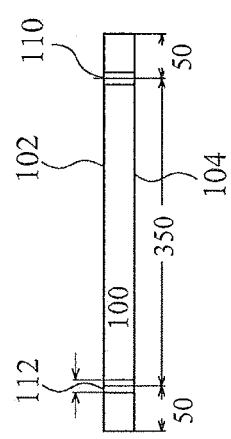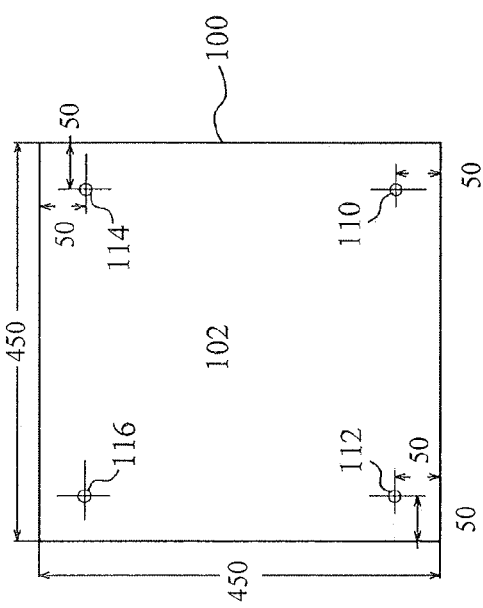

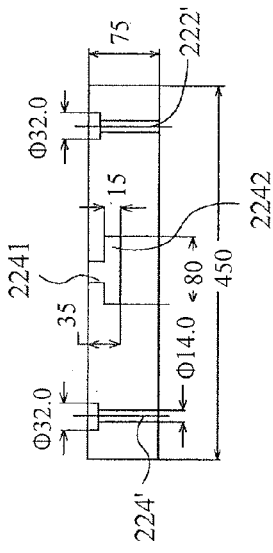
*Fig. 3F*
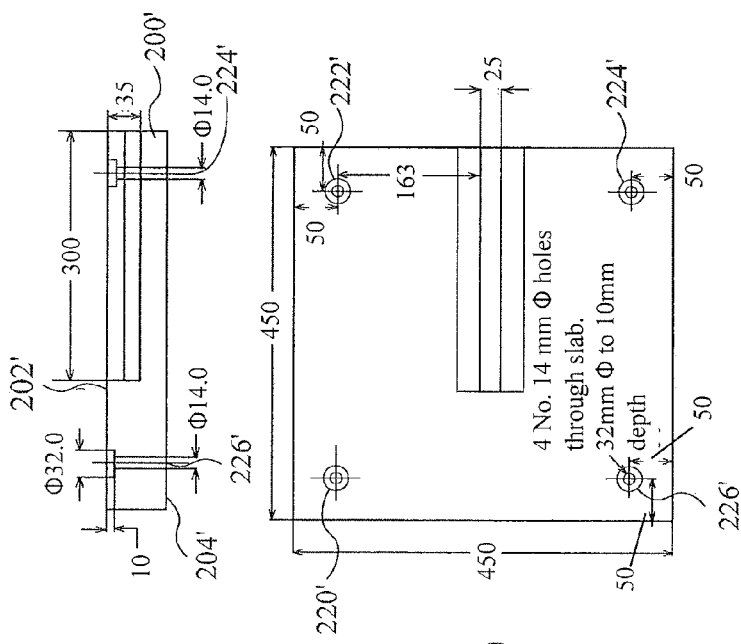
*Fig. 3E*
*Fig. 3D*

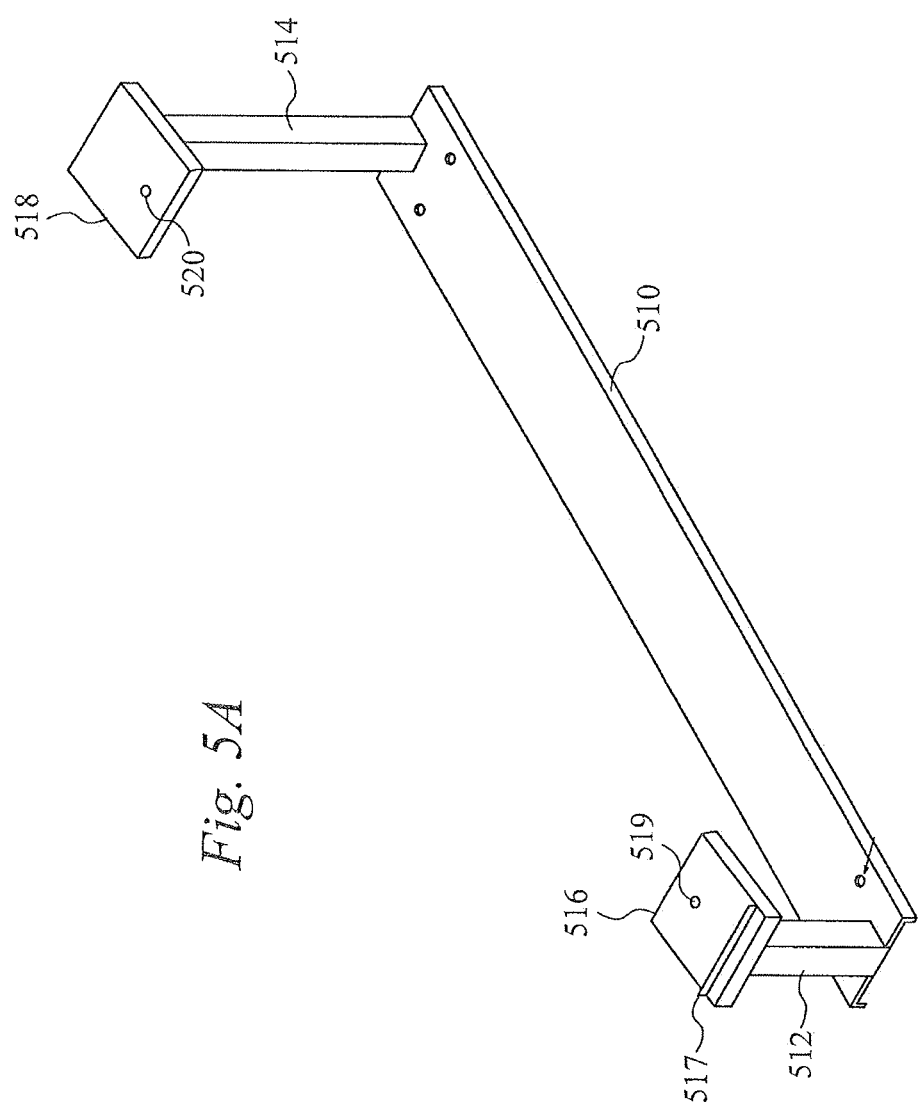

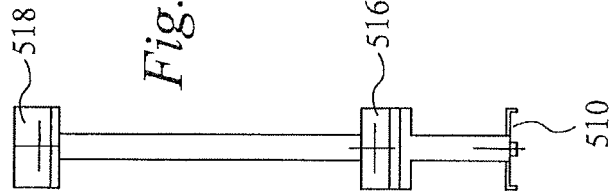
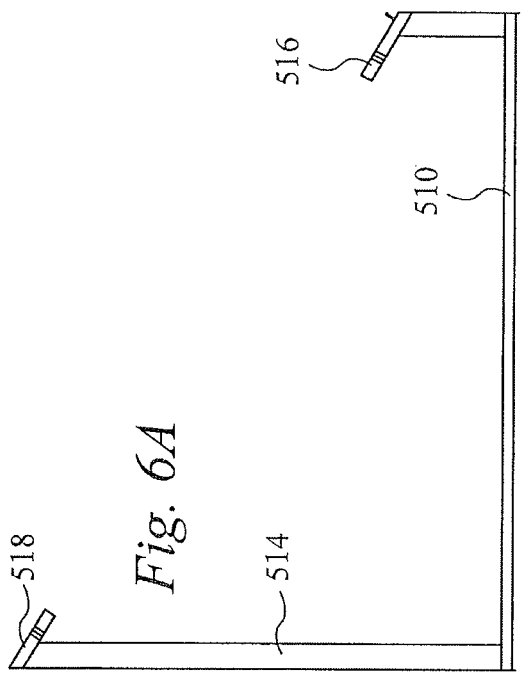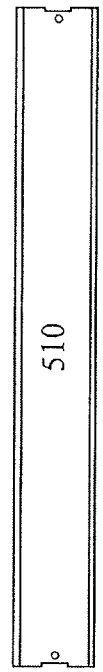
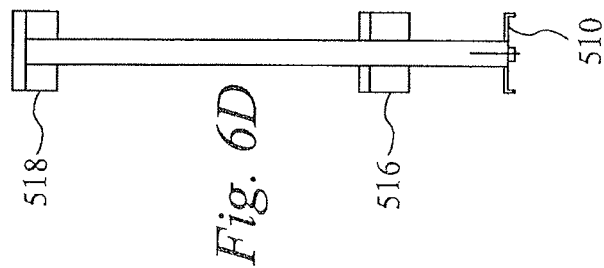

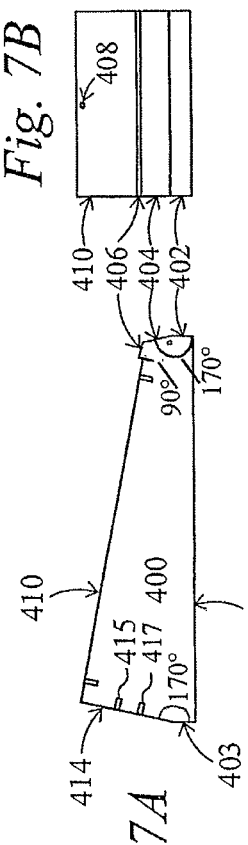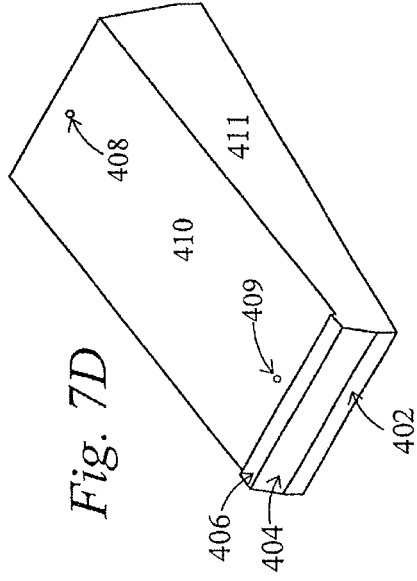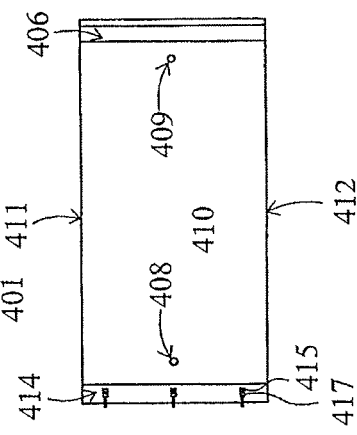

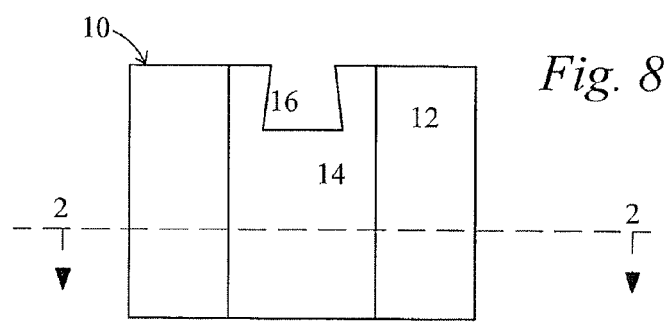
*Fig. 8*
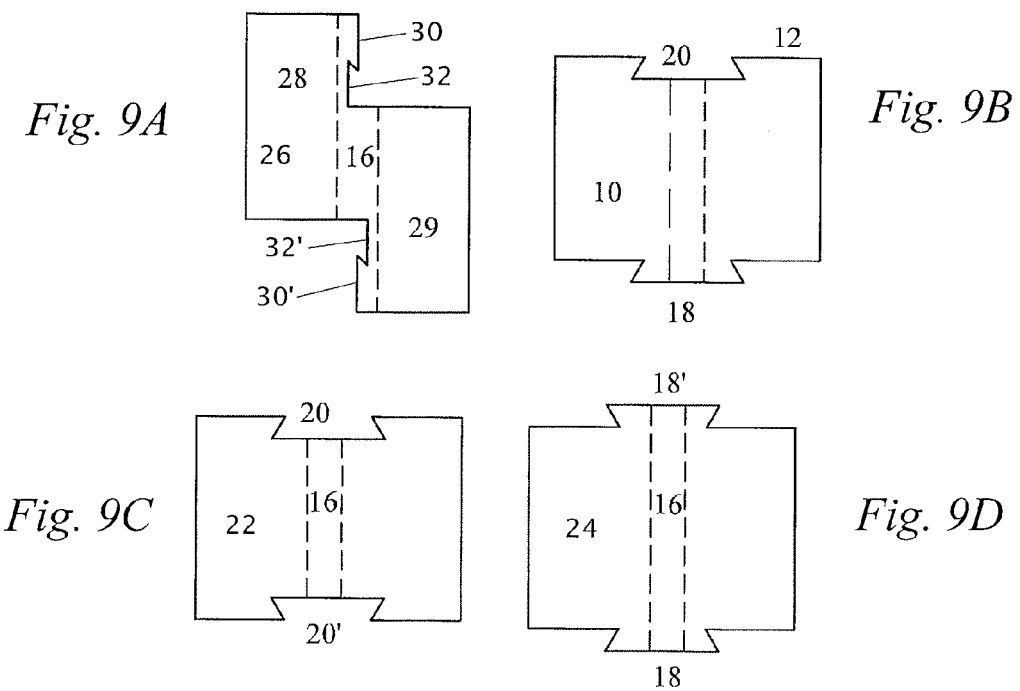
*Fig. 9A*  *Fig. 9B*
*Fig. 9C*  *Fig. 9D*

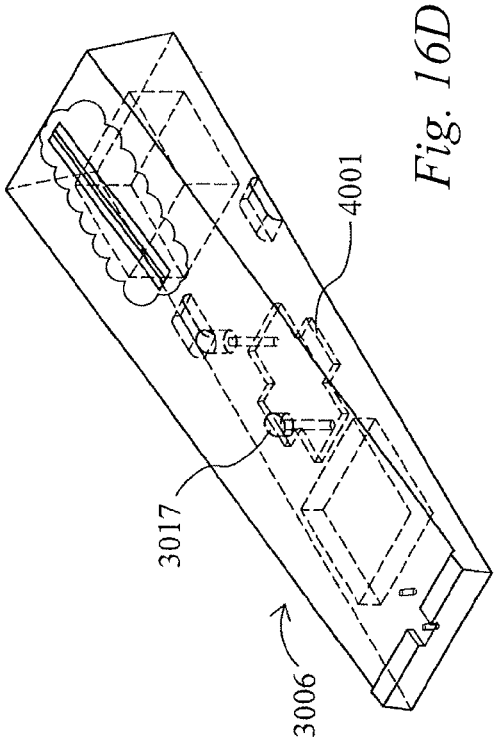
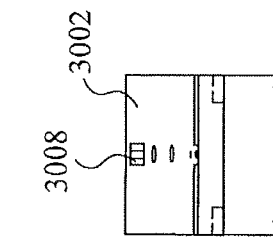
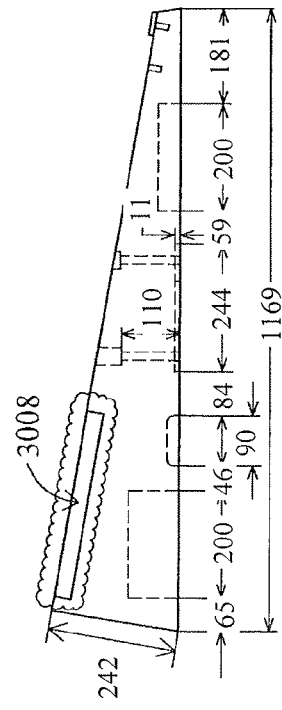
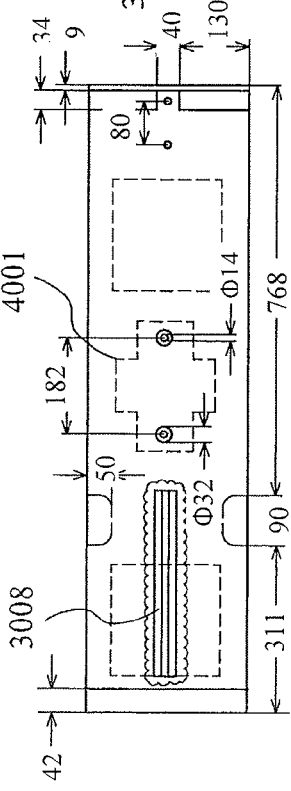

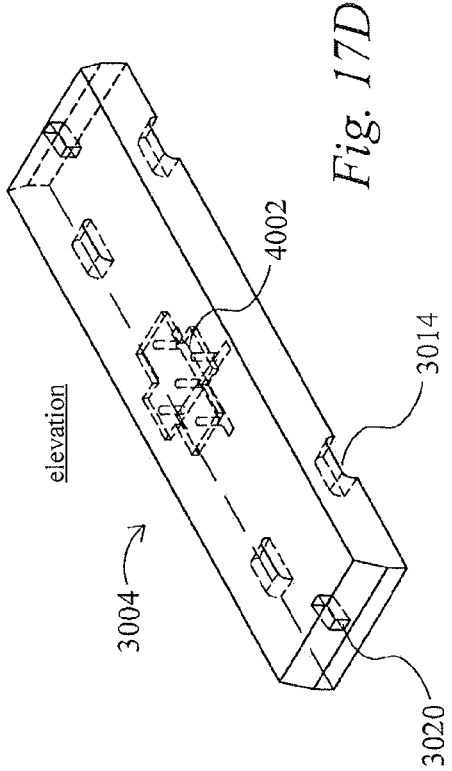
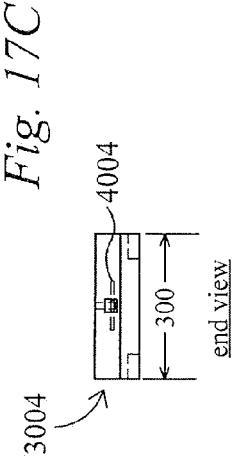
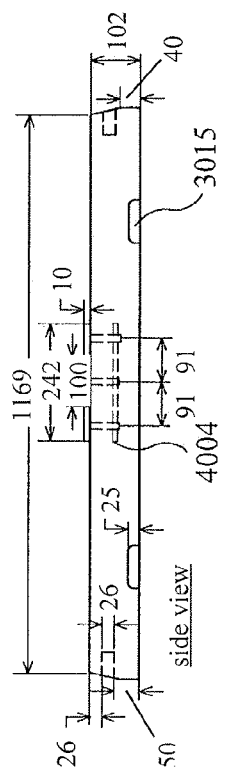
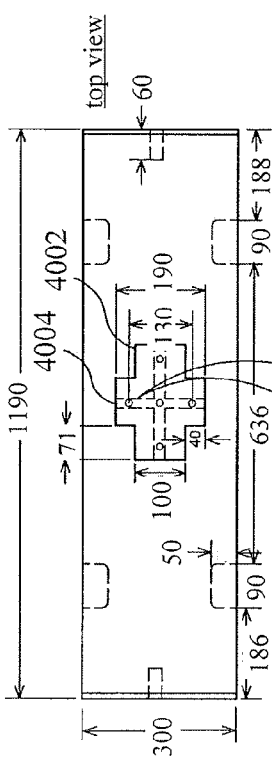
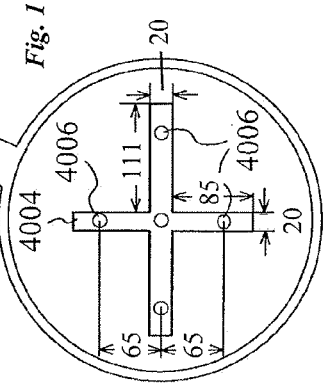

MOUNTING DEVICE AND METHOD OF INSTALLING OF A SOLAR PANEL

CROSS-REFERENCE TO RELATED APPLICATIONS

This application is a continuation-in-part of International Application No. PCT/GB2011/051685, filed Sep. 8, 2011 (and published as WO 2012/032352); which claims priority to UK Patent Application No. 1015019.1, filed Sep. 9, 2010; both of which are incorporated by reference in their entireties.

BACKGROUND OF THE INVENTION

The present invention relates to a mounting device for a structure such as a solar panel and to a method of installing a solar panel.

The problems of anthropogenic climate change are well known. Micro-power generation, for example using solar panels, is an increasingly popular way to provide a renewable source of energy for domestic and commercial use.

Solar panels incorporating photovoltaic cells or heat collectors (such as flat plate collectors used for heating water) are typically large planar structures manufactured from relatively rigid, relatively lightweight materials. In use these structures must be placed in relatively exposed locations, such as rooftops and are typically inclined using a frame to present the greatest possible surface area to the sun.

Solar panels for a private dwelling typically have a surface area of about 1.5-3 $m^2$ in cross section and are relatively thin, usually a few centimetres thick. Installations for larger dwellings or commercial properties may be substantially larger in area but, in general are of a similar thickness. Particularly in the case of photovoltaic cells, the cost of such arrangements is considerable. The size and arrangement of solar panel structures makes them susceptible to damage by winds and it is necessary to secure the panels to prevent them from being damaged or blown away in high winds.

It has been proposed to secure such panels to roofing by drilling into roof joists and securing the frame of the panel to the roof joists using bolts or screws. It is generally necessary to anchor the solar panel to many joists in order to spread the load. As such, many bolts and hence many holes may be required. This presents a problem, particularly for a flat roof, in that each of the holes must be individually sealed to prevent water seeping through the holes in the roof and damaging the building. One approach using a frame like system is described in Japanese patent JP-A-2000-064523 which employs a light weight channel shaped frame for installation of solar cell panels. The frames include holding portions which have sideways openings to allow insertion of a solar panel in a lateral direction. Mounting frames, such as wall mounts for screens (like those produced by AVF Group Ltd. http://www.avf-eco.com) provide another example of this approach.

Another option is to position large concrete blocks on a roof and to bolt the panel, or a support frame carrying the panel, to the concrete blocks. This has the advantage that it is not necessary to drill into the roof. However hoisting large blocks of concrete onto a roof and manoeuvring them can present a substantial hazard and/or risk damaging the structure of the roof. In an attempt to reduce the mass of ballast required to mitigate this hazard, U.S. Pat. No. 6,570,084 describes a pressure equalising photovoltaic assembly and method in which a PV assembly includes a base, a PV module and a support assembly securing the PV module to a position overlying the upper surface of the base. Vents are formed through the base. A pressure equalisation path extends from the outer surface of the PV module, past the peripheral edge of the PV module to and through at least one of the vents, and to the lower surface of the base to help reduce wind uplift forces on the PV assembly. Another ballasted system is described in International Patent Application publication number WO2009/120923 which employs a solar module integration system including ballast, a sole mechanically linked to the bottom surface of the ballast and a link member embedded in the ballast, an attachment module mechanically coupled to the link member, and a deflector mechanically coupled to the link member. The frame is electrically earthed and cabling for a solar panel module is routed through a wire chase in the frame.

As set out in the foregoing paragraphs, the problem of secure solar panel mounting has been addressed using a number of different approaches yet there remains an unmet need in the art for a reliable, robust, easily transportable and easily installed mounting device for solar panels.

Aspects and examples of the invention are set out in the claims and address at least a part of the above described technical problem.

SUMMARY

In an aspect there is provided a solar panel mounting anchor adapted for mounting a solar panel on a flat roof, the anchor comprising integral ballast, and edges comprising a resilient material and at least one engagement feature adapted to receive a solar panel and to space the panel from said roof, and a base adapted to inhibit slipping of the anchor on said roof. In one possibility the integral ballast is such that the mass of the anchor is at least 15 kg. These and other examples of the invention have the advantage of providing a secure and easily installable mounting for a flat roof which is able to adapt to irregularities in roof shape and in which the hazard associated with mounting a solar panel to a roof is substantially reduced because, if the ballast is accidentally dropped during installation it is less likely to be damaged or to cause damage or injury. Further advantageously the resilient nature of the anchor/ballast structure enables it to deform to absorb stresses associated with any possible misalignment of the ballast and support structure with a solar panel which is assembled to the structure.

In some possibilities the ballast comprises an inclined support surface carrying the engagement feature, and the engagement feature comprises a rigid member having a groove adapted to receive a fixture for securing a solar panel to the ballast.

In some possibilities the groove is elongate and has a length to enable said fixture to secure said solar panel to the ballast at one of a range of positions along the length of the groove, wherein the length of the groove extends along the support surface, wherein the length of the groove is substantially greater than a width and a depth of the groove, wherein the groove is substantially rectangular.

In some possibilities the rigid member comprises a first side wall extending along a first side of the elongate groove, and a second side wall extending along a second side of the elongate groove, wherein the first side wall is opposite to the second side wall and the first and second sidewalls extend to a depth thereby to define the groove and wherein the first side wall and the second side wall comprise elongate ridges extending along at least a portion of the elongate groove, wherein the sidewalls are substantially planar. In some possibilities the ridges on the first side wall, and the ridges on the second side wall are substantially aligned with each other and offset in a depth direction. In some possibilities the rigid member is substantially embedded in the ballast.

In some possibilities the groove has a depth, and the rigid member comprises a protrusion which extends outwardly from the groove transverse to the depth of the groove and into the ballast. In some possibilities the protrusion is disposed near a base of the groove. In some possibilities the protrusion carries a ridge, spaced from a side wall of the groove which extends towards the support surface.

The ballast may comprise a first ballast body comprising a support surface for supporting a second ballast body; a second ballast body comprising an inclined support surface for supporting a solar panel, and a base surface opposite to the inclined support surface adapted to be supported on the support surface of the first ballast body. At least one of the support surface of the first ballast body and the base surface of the second ballast body may comprise a keying feature adapted to mutually align the first ballast body with the second ballast body. The keying feature may comprise at least one of a protrusion and a recess, and the keying features may be complementary. Some keying features can be rectilinear, for example they may be cross shaped. The first ballast body may comprise non-parallel surfaces, for example it may be wedge shaped and/or comprise an inclined support surface, opposite to and inclined with respect to a base surface, for supporting a solar panel. The first body and/or the second body may comprise voids. The voids may be substantially enclosed, for example the voids may be enclosed by a surface of the other body.

The first ballast body can be made substantially of a resilient material and may comprise a rigid member, the second ballast body may comprise holes for receiving fixtures to secure the first ballast body to the second ballast body. The holes may be arranged to direct the fixtures into engagement with the rigid member. The rigid member may be substantially contained in the first ballast body, for example it may be embedded in or moulded into first ballast body. The rigid member may be a plate or bar and may comprise predrilled holes for receiving fixtures. The holes may be threaded.

The engagement feature may comprise a channel for receiving a frame member of a solar panel support frame, wherein the channel comprises an elongate opening on a surface of the ballast, and an interior portion within the ballast, wherein the interior portion of the channel is wider than the opening.

In an aspect there is provided an apparatus comprising: a plurality of solar panel mounting anchors; a first solar panel coupled to a first solar panel mounting anchor of the plurality of solar panel mounting anchors and disposed at a first incline angle; a second solar panel coupled to a second solar panel mounting anchor of the plurality of solar panel mounting anchors, wherein the second solar panel is spaced from the first solar panel anchor by a first distance, wherein the first distance is selected based on the first incline angle.

The second solar panel can be disposed at a second incline angle, and the second incline angle is selected based on the first distance and the first incline angle.

In an aspect there is provided an apparatus comprising: a solar panel; a plurality of frame members arranged to support the solar panel; a plurality of solar panel mounting anchors adapted for mounting a solar panel on a surface, each anchor comprising: integral ballast; edges comprising a resilient material; at least one channel adapted to receive at least one of said frame members for securing a solar panel to the anchor so that the solar panel is spaced from said surface; and a base adapted to inhibit slipping of the anchor on said surface; wherein the channel is configured to restrain the at least one frame member to inhibit removal of the frame member from the channel. The channel may comprise a recess for receiving the frame member, and a neck portion disposed adjacent a surface of the anchor between the recess and the surface wherein the neck portion is narrower than the recess whereby the channel is configured to restrain the at least one frame member to inhibit removal of the frame member from the channel. Wherein the frame members are tapered or comprise transverse sections extending into the recess A predrilled threaded recess may be disposed in the channel.

In one possibility the anchor may consist substantially of a resilient material. In one possibility the anchor may be molded or formed from a resilient material such as rubber or another elastomer type polymer. This and other examples of the invention have the advantage that the anchor can be manufactured in a single step process. The resilient material may comprise a high density rubber, in one possibility the high density rubber has a density of more than about 1400 $kgm^{-3}$.

In one possibility the anchor comprises at least 25% by volume of the resilient material, in one possibility the resilient material is disposed around the periphery of the anchor to provide resilient edges. This and other examples of the invention have the advantage that a secure mounting for a solar panel can be safely assembled in situ. The hazards of working with heavy weights at height are reduced because of the resilient nature of the ballast. For example the hazard associated with dropping the anchor or maneuvering it into position is lessened.

As used herein the term "resilient" means elastically deformable. The resilient edges are preferably sufficiently resilient that, when dropped from a height of up to 1 meter onto a concrete surface of 100 mm thickness, the anchor or ballast will tend to deform rather than break or shatter or damage the surface onto which it is dropped.

In some possibilities the anchor comprises a mass of material having a density substantially greater than the density of the resilient material. In one possibility the mass comprises a material having a density of more than about 2000 $kgm^{-3}$ preferably more than about 2200 $kgm^{-3}$ and, for example, may comprise concrete. In one possibility the anchor is less than 300 mm in height and still more preferably less than 200 mm in height. In one possibility the resilient material has a density of more than about 1000 $kgm^{-3}$, preferably more than about 1100 $kgm^{-3}$. For example, the resilient material may comprise a high density rubber, in one possibility the high density rubber has a density of more than about 1400 $kgm^{-3}$. This and other examples of the invention have the advantage of providing sufficient ballast without elevating the solar panel frame excessively and thus increasing wind load.

In some possibilities the anchor comprises additional ballast couplable to the anchor to adjust the weight of the anchor. These and other examples of the invention have the advantage of providing an anchor of greater weight in which the anchor and additional ballast components can be lifted and maneuvered individually for installation by a single technician to enable the mounting device to be easily installed in locations inaccessible to heavy lifting equipment.

In one possibility the additional ballast comprises at least 25% by volume of the resilient material, in one possibility the resilient material is disposed around the periphery of the additional ballast to provide resilient edges. In one possibility the additional ballast comprises a mass of material having a density substantially greater than the density of the resilient material. In some possibilities the additional ballast consists substantially of the resilient material. In some possibilities the mass of material having a density substantially greater than the density of the resilient material has a density of more than about 1900 kgm$^{-3}$. In some possibilities the additional ballast is adapted to provide a base to inhibit slipping of the anchor on said roof. In some possibilities the additional ballast is pre-drilled to enable it to be coupled to the anchor. In some possibilities the additional ballast and/or the anchor comprises recesses arranged to provide handholds to enable a user to manipulate the additional ballast. These and other examples of the invention have the advantage that ballast of great weight can be easily maneuvered into position and assembled safely by a lone technician.

In some possibilities the resilient material comprises an elastomer type polymer such as rubber, in one possibility the resilient material has a density of more than about 400 kgm$^{-3}$, in one possibility the resilient material comprises a crumbed or recycled rubber. These and other examples of the invention have the advantage of reducing the environmental impact of solar panel installations In some possibilities the engagement feature comprises a predrilled recess and a lip or abutment adapted to cooperate with the recess for securing the solar panel to the anchor. This has the advantage that a solar panel or frame can be temporarily assembled to the anchor before it is fixed in position. In one possibility the engagement feature comprises a channel for receiving a frame member of a solar panel support frame. In some possibilities a predrilled threaded recess is disposed in the channel. This and other examples of the invention have the advantage that a solar panel can be quickly and securely fixed to the anchor in situ.

In one possibility the anchor comprises a substantially wedge shaped block and in which the engagement feature is disposed on a surface inclined with respect to the base. As used herein the term "wedge shaped" includes structures having non parallel surfaces which do not necessarily taper to a point. In one possibility the engagement feature is disposed on a surface of the anchor inclined with respect to the base by an angle of less than about 15°, preferably less than about 12°, preferably more than about 2°, preferably more than about 5°, preferably about 10°. This and other examples of the invention have the advantage that a solar panel can be secured directly to ballast without the need for a frame to adjust the angle of the panel.

In one possibility the engagement feature is adapted to engage with at least two solar panels to couple the solar panels together and to the anchor. In some possibilities the engagement feature comprises at least two predrilled recesses and in which the kit comprises a U-shaped bolt to cooperate with two of the predrilled recesses to couple two solar panels together and to the anchor. In some possibilities the engagement feature comprises a lip or abutment for supporting the solar panel. This and other examples of the invention have the advantage that an assembly of inclined solar panels can be quickly and safely assembled to ballast without the need for a separate frame.

In some possibilities the anchor comprises a substantially flat slab having first and second major surfaces which are substantially square in shape and have an area of less than about 600 mm by 600 mm. In some possibilities the first and second major surfaces of the anchor have an area of less than about 500 mm by 500 mm. In some possibilities the first and second major surfaces of the anchor have an area of more than about 300 mm by 300 mm. In some possibilities the first and second major surfaces of the anchor have an area of more than about 400 mm by 400 mm. In some possibilities the first and second major surfaces of the anchor have an area about 450 mm by 450 mm. In some possibilities the anchor is less than about 250 mm thick. In some possibilities the anchor is less than about 200 mm thick. In some possibilities the anchor is less than about 150 mm thick. In some possibilities the anchor has a mass of more than about 12 kg. In some possibilities the anchor has a mass of more than about 20 kg. In some possibilities the anchor has a mass of less than about 40 kg. In some possibilities the anchor has a mass of less than about 35 kg. In some possibilities the anchor has a mass of less than about 30 kg. In some possibilities the anchor has a mass of about 25 kg. The applicant has found that anchors having these masses and dimensions can be safely maneuvered into place surprisingly easily by a lone technician.

In some possibilities the additional ballast comprises a substantially square slab of less than about 100 mm thickness, in other possibilities less than about 75 mm thickness, in other possibilities less than about 50 mm thickness, in other possibilities less than about 40 mm thickness. In some possibilities the additional ballast comprises a substantially square slab of more than about 10 mm thickness. In some possibilities the additional ballast comprises a substantially square slab of more than about 20 mm thickness. In some possibilities the additional ballast comprises a substantially square slab of about 30 mm thickness. In some possibilities the additional ballast comprises a substantially square slab having first and second major surfaces of less than about 600 mm by 600 mm in size. In some possibilities the additional ballast comprises a substantially square slab having first and second major surfaces of less than about 500 mm by 500 mm in size. In some possibilities the additional ballast comprises a substantially square slab having first and second major surfaces of more than about 300 mm by 300 mm in size. In some possibilities the additional ballast comprises a substantially square slab having first and second major surfaces of more than about 400 mm by 400 mm in size. In some possibilities the additional ballast comprises a substantially square slab having first and second major surfaces of about 450 mm by 450 mm in size. In some possibilities the additional ballast comprises a substantially flat slab. 61. In some possibilities the additional ballast has a mass of more than about 6 kg. In some possibilities the additional ballast has a mass of more than about 9 kg. In some possibilities the additional ballast has a mass of more than about 10 kg. In some possibilities the additional ballast has a mass of less than about 20 kg. In some possibilities the additional ballast has a mass of less than about 15 kg. In some possibilities the additional ballast has a mass of about 11 kg. The applicant has found that ballast having these masses and dimensions can be safely maneuvered into place surprisingly easily by a lone technician.

In some possibilities the additional ballast comprises a substantially wedge shaped block having first and second major surfaces in which the first and second major surfaces are inclined with respect to each other by an incline angle. In some possibilities the wedge shaped block has an incline angle selected from the group comprising: 1°, 2°, 3°, 4° and 5°. In some possibilities the invention provides additional shims having non parallel surfaces inclined with respect to each other by an incline angle selected from the group comprising: 1°, 2°, 3°, 4° and 5°. The shims may or may not comprise integral ballast. These and other examples of the invention have the advantage that the anchors can be adjusted or 'shimmed' to accommodate differently inclined roofs. As will be appreciated by the skilled practitioner in the context of the present disclosure, typically a flat roof is built with a slight incline to ensure rainwater is drained from the roof. Thus examples of the invention have the advantage of providing a standard kit being adaptable to differently inclined roofs.

In some possibilities the wedge shaped block comprises an indication of the incline angle. In some possibilities the indication comprises a numeric indication, or a non-numeric indication, such as colour coding, to enable the inclination angle of the wedge shaped blocks to be readily identifiable.

In an aspect there is provided a solar panel mounting system for mounting a solar panel on a roof, the system comprising: a plurality of anchors having integral ballast, resilient edges, at least one engagement feature arranged to secure a solar panel to the anchor and to space said solar panel from said roof and a base adapted to inhibit slipping of the anchor on the roof; a plurality of shims, the shims comprising a substantially flat shim and at least one shim having non parallel sides, wherein the shim slabs are configured to be coupled to one of the plurality of anchors to adjust the size and shape of the one of the plurality of anchors.

In some possibilities the solar panel mounting system comprises a plurality of shims having non parallel sides wherein the non parallel sides are inclined with respect to each other by an incline angle, wherein the incline angle is selected from the group comprising 1°, 2°, 3°, 4°, 5° and 10°. In some possibilities the plurality of shims having non parallel sides comprise a first and second shim, the incline angle of the second shim being different from the incline angle of the first shim. These and other examples of the invention have the advantage that the anchors can be adjusted or 'shimmed' to accommodate irregularities in the form of a roof or, in some examples, to allow the anchor to be used to install a solar panel on a sloping roof. In one possibility the shims comprise resilient material.

In some possibilities the shims being configured to be coupled to one of the plurality of anchors comprises the shims comprising a hole or recess to receive a fixture to secure the shim to the anchor. In some possibilities the shims being configured to be coupled to one of the plurality of anchors comprises the shims comprising a bonding surface adapted to be bonded to the anchor with adhesive. In some possibilities the bonding surface comprises a textured surface.

In some possibilities the solar panel mounting system comprises a solar panel frame comprising a frame member adapted for coupling with a solar panel and with an engagement feature of one of the plurality of anchors. In some possibilities the solar panel mounting system comprises a solar panel. In some possibilities the engagement feature of at least two of the plurality of anchors is disposed on a surface of the anchor which is not parallel with the base. In some possibilities the engagement feature of the at least two of the plurality of anchors is adapted for coupling to two solar panels. In some possibilities solar panel mounting system comprises at least two solar panels and at least six anchors, wherein the solar panels are arranged adjacent one another on the anchors such that two of the anchors are assembled to the at least two solar panels.

In an aspect there is provided a method of securing a solar panel to a roof comprising: positioning a plurality of anchors on the roof, the anchors each comprising integral ballast and having resilient edges and at least one engagement feature for mounting a solar panel to the anchor; assembling one of a plurality of shims to one of the anchors, the plurality of shims comprising a substantially flat shim and at least one shim having non parallel sides, wherein the shim slabs are configured to be coupled to one of the plurality of anchors to adjust the size and shape of the one of the plurality of anchors; assembling a first solar panel to one of the plurality anchors; and securing the first solar panel to the engagement feature of the one of the plurality anchors. The use of resilient materials to provide an anchor has the advantage that typically, solar panels are mounted on A-frame or lean-to type frame structures. These frames may be provided in a variety of sizes and configurations. Where such frames are bolted to concrete blocks or to a roof structure, there is a need to match the positioning of the fixtures to the size and shape of the frame to within a reasonably high accuracy. Misalignments place stress on the frame and/or the fixing points. Advantageously, because the anchor comprises resilient material, the anchor structure can resiliently accommodate misalignment between the anchors and the solar panel or frame to facilitate the use of standard sized frames/panels in locations where the position of the anchors is constrained, for example by irregular roof structures. Further advantageously the provision of a plurality of shims allows the anchor structure to be customised in situ according to operational requirements but without the need for sophisticated tools.

In some possibilities the method comprises assembling additional ballast members to at least some of the plurality of ballast members.

In some possibilities the plurality of anchors comprise at least six anchors, the method comprising assembling the first solar panel and the second solar panel to a common one of the plurality of anchors and securing the first and second solar panel to the common one of the plurality of anchors.

In some possibilities assembling the solar panel to the ballast comprises assembling a substantially rigid solar panel frame to the ballast and securing the frame to the at least one engagement feature in which securing the solar panel to the at least one engagement feature comprises securing the solar panel to the frame.

In an aspect there is provided a resilient ballasted solar panel anchor. In an aspect there is provided a solar panel assembly substantially as described herein and/or with reference to the accompanying drawings. In an aspect there is provided a solar panel anchor substantially as described herein and/or with reference to the accompanying drawings. In an aspect there is provided a method of installing solar panel anchor substantially as described herein and/or with reference to the accompanying drawings.

In an aspect there is provided a kit of parts comprising a plurality of bars for assembling a frame to support a solar panel and a plurality of resilient substantially cuboid blocks, each block having at least two coupling features for coupling with a coupling feature of another block having a corresponding coupling feature and a fitting for coupling the frame to the block, wherein the fittings and couplings are arranged such that, when two or more blocks are coupled together the fittings can cooperate to receive the frame so that the coupling features and the frame cooperate to hold the blocks together to form an anchor. This and other examples of the invention have the advantage that a single type of frame and anchor can be used to install a solar panel of arbitrary size. Securing larger panels or arrays of panels requires only that more blocks and bars provided. The kit can be assembled in situ to meet the needs (topography incline etc) of any particular deployment. In one possibility as described elsewhere herein, the blocks comprise resilient material. In one possibility the blocks comprise a resilient material such as rubber and are elongate so that the anchor blocks can be mutually interlocked so that the frame need not comprise tie bars and, because the resilient/rubber blocks are high friction they grip the surface on which the frame is deployed.

In one possibility each block weighs between about 10 kg and about 25 kg. This has the advantage that the elements of the anchor can be carried safely onto a roof by a single workman without the need for specialist lifting gear and, once the elements of the anchor have been carried to the roof, the anchor can be assembled in situ. Where the blocks are resilient these modular systems have the further advantage that, in the event that a block is accidentally dropped whilst being moved into position on the roof, it is less likely to be damaged and less likely to cause damage or injury.

In one possibility the anchor comprises at least three blocks and a kit of parts comprises four such anchors (each weighing about 30 kg to about 120 kg).

In one possibility the bar receiving elements comprise bar receiving recesses. This has the advantage that the anchor/frame system can be assembled by a single workman because a bar can be seated in the recess to hold the blocks in place whilst additional fixtures are applied and/or a frame including the bar is assembled.

In one possibility the bar receiving recesses comprise ridged lips arranged to retain a bar in the recess. In one possibility the bar receiving recess is narrower along the outside of the block than in the interior of the block, for example having a reverse tapered or reverse trapezoidal cross section. These possibilities have the advantage of gripping a bar received in the recess so that a frame can be assembled to the anchor without the need to bolt (or otherwise fix) the frame to the blocks. In examples where the blocks comprise resilient material, these possibilities have the further advantage that a variety of sizes of bar can be accommodated by a standard sized block because the recess can resiliently conform to various bars and securely hold them in place.

In one possibility the bar receiving elements comprise protrusions adapted to mate with a corresponding recess of a bar.

In one possibility the anchor or the kit of parts further comprises one or more feet, each foot having a plurality of couplings each coupling arranged to interlock with a complementary feature of a respective one of the plurality of blocks. This has the advantage that the blocks can be more securely held in place.

In one possibility the feet are wedge shaped. This has the advantage that the anchor can be more securely positioned on a sloping roof. In one possibility a surface of the wedge shaped feet is terraced to mate with roof tiles on a sloping roof. This has the advantage of providing a greater surface are of the foot in contact with the roof to improve the grip and stability of the anchor on a sloping tiled roof.

In one possibility the bar receiving elements comprise predrilled, preferably threaded, fittings. This has the advantage that a bar can be secured to the anchor using standard bolts without the need for the anchor to be drilled in situ.

In one possibility the coupling features comprise dovetail type features. For example a block may comprise a dovetail protrusion (e.g. a reverse tapered or trapezoidal protrusion or any protrusion which has a body joined to the block by a neck narrower than the body). A block may also comprise a dovetail recess (e.g. a recess which is broader inside the recess than at the opening/mouth of the recess). In one possibility the blocks are mutually similar, for example each block may have at least one dovetail protrusion and at least one dovetail recess. This has the advantage that it is necessary to produce only a single type of block to produce an anchor of arbitrary size.

To assist in understanding the present disclosure teaches the invention at varying levels of generality. This is not to be construed as in any way limiting. The scope of the invention is defined in the appended claims.

Any individual feature of any aspect example or embodiment of the invention may be used in combination with any one or more features of any other aspect example or embodiment described herein. The reader is instructed to select particular features from the examples described herein, regardless of whether they are described alone or in combination with other features and to use the selected feature(s) with other such features (or combinations thereof) in order to address the above described technical problem(s). It is understood that such combinations are within the scope of the present disclosure. The reader is further instructed, to combine said selected features with the one or more features of the general aspects and principles of the invention described herein in order to address the above described technical problem(s).

BRIEF DESCRIPTION OF DRAWINGS

Possible implementations of the invention will now be described, by way of example only, with reference to the accompanying drawings, in which:

FIGS. 1A, 1B and 1C show side, end, and top views, respectively, of a ballast block;

FIGS. 3D, 3E and 3F show top, side and end views, respectively, of an alternative mounting for a frame as shown in FIGS. 5 and 6;

FIG. 5A shows a perspective view of a frame for a solar panel;

FIGS. 6A, 6B, 6C, 6D, and 6E show side, first end, bottom, second end, and top views, respectively, of the frame of FIG. 5A;

FIGS. 7A, 7B, 7C, and 7D show side, end, top and perspective views, respectively, of a substantially wedge shaped mounting;

FIG. 8 shows a side view of one of a plurality of mutually interlockable ballast blocks;

FIGS. 9A to 9D show a set of cross sections for blocks according to FIGS. 7A-7D;

FIGS. 16A, 16B, 16C, and 16D show side, top, end, and perspective views, respectively, of a ballast body of the solar panel anchor shown in FIG. 15A to 15C;

FIGS. 17A, 17B, 17C, and 17D show side, top, end, and perspective views, respectively, of another ballast body of the solar panel anchor shown in FIG. 15A to 15C;

DETAILED DESCRIPTION

Figure 2B:
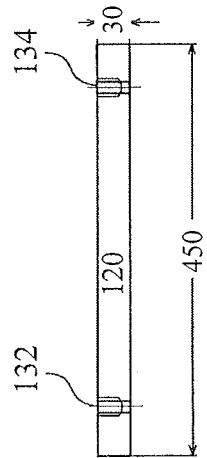
FIGS. 2A, 2B and 2C show side, end, and top views, respectively, of a base for a mounting device.

FIG. 1 shows a resilient edged ballast 100 and, in FIG. 1: FIG. 1A shows a side view, FIG. 1B shows an end view and FIG. 1C shows a top down view of a block 100. Block 100 has first and second major surfaces 102, 104. Holes 110, 112, 114, 116 are laterally offset from the ends and sides of the block substantially adjacent the corners and pass through the block 100 from the first major surface 102 to the second major surface 104. In the example of FIG. 1 the first and second major surfaces 102, 104 of the block 100 are substantially square in shape and 450 mm by 450 mm in size. The holes 110, 112, 114, 116 are each similarly spaced from the two respective nearest sides of the block 100 by 50 mm. The block 100 is 30 mm thick. As will be appreciated by the skilled practitioner in the context of the present disclosure, the stated dimensions are merely a particularly advantageous example and other sizes of block are contemplated.

Figure 2A:
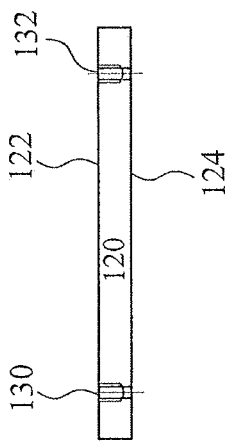
Figure 2C:
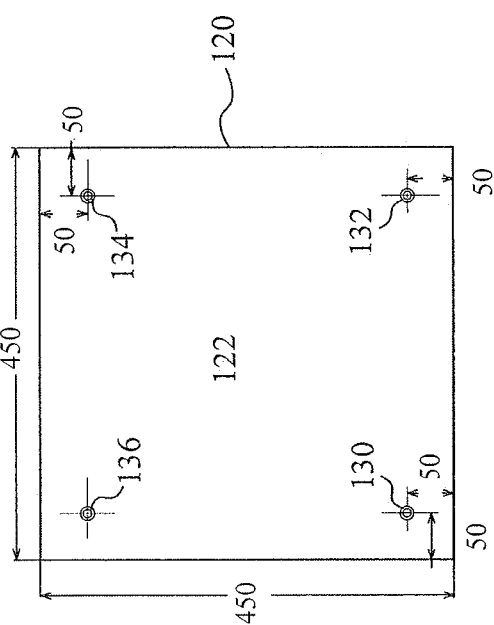

FIG. 2 shows a base 120 for block 100 and, in FIG. 2: FIG. 2A shows a side view, FIG. 2B shows an end view and FIG. 2C shows a top down view of base 120. Base 120 has first and second major surfaces 122, 124. To correspond with the block 100 (FIGS. 1A to 1C) holes 130, 132, 134, 136 are laterally offset from the ends and sides of the base substantially adjacent the corners on the first major surface 102. Holes 130, 132, 134, 136 are threaded for receiving a threaded bolt. In the example of FIG. 2, rivet nuts are used to provide this threading. In the example of FIG. 2 the first and second major surfaces 122, 124 of the base 120 are substantially square in shape and 450 mm by 450 mm in size to correspond to block 100 (FIG. 1) and, to correspond with block 100 (FIG. 1) the holes 120, 122, 124, 126 are each similarly spaced from the two respective nearest sides of the base to lie adjacent respective ones of holes 110, 112, 114, 116 (FIG. 1) when the base is assembled to a block 100 (FIG. 1). The base 120 is 30 mm thick. As will be appreciated by the skilled practitioner in the context of the present disclosure, the stated dimensions are merely a particularly advantageous example and other sizes of base are contemplated.

FIG. 3 shows an anchor 200 for mounting a frame (not shown) to ballast 100 (FIG. 1) and/or base 120 (FIG. 2). Anchor 200 comprises ballast and coupling to additional ballast 100 is optional and provides the advantage that the ballast of the anchor can be adjusted to deal with different wind conditions and/or to adjust the spacing between the solar panel and the roof to which it is to be mounted. Similarly, the surface of anchor 200 comprises rubber and as such the anchor 200 comprises an integral base which will inhibit slipping of the anchor on a roof.

Figure 3B:
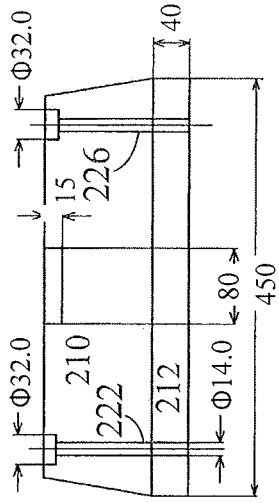
FIG. 3B shows an end view of a mounting for a frame as shown in FIGS. 5 and 6.
Figure 3A:
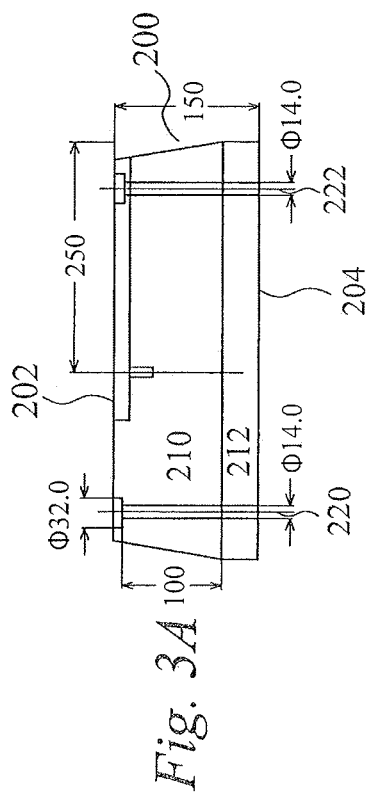
FIG. 3A shows a side view of a mounting for a frame as shown in FIGS. 5 and 6.
Figure 3C:
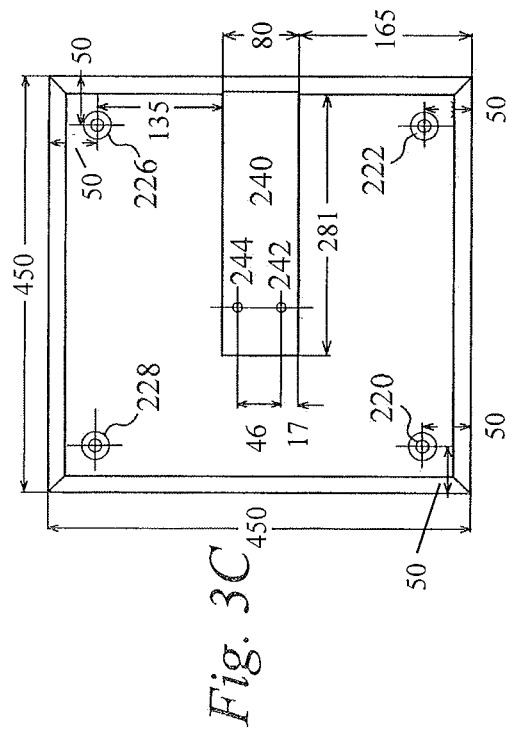
FIG. 3C shows a top view of a mounting for a frame as shown in FIGS. 5 and 6.

In FIG. 3: FIG. 3A shows a side view, FIG. 3B shows an end view and FIG. 3C shows a top down view of base 120. Seat 200 has first and second sections 210, 212 and first and second major surfaces 202, 204. First major surface 202 is larger than second major surface 204. Thus, section 210 is trapezoidal in cross section and the shorter parallel side of the trapezoidal shape corresponds to first major surface 202. Second section 212 is rectangular in cross section. The first and second sections are adjacent each other so that the first section 210 and second section 212 provide a sloping sided terraced block with a substantially flat first major surface 202 and second major surface 204. Holes 220, 222, 224, 226 pass from the first major surface 202 of mounting 200 to the second major surface 204. The mouths of the holes 220, 222, 224, 226 are countersunk into the first major surface 202.

A rectangular channel 240 is recessed into the first major surface 202 of the mounting 200. Two blind holes 244 242 are positioned in the channel spaced from the sides of the channel. The blind holes are threaded to receive a bolt, for example the threading may be provided by a rivet nut. One end of the rectangular channel 240 is open to the side of the mounting so that a frame member can be slid into the channel from its open end.

The second major surface 204 is substantially square in shape and 450 mm by 450 mm in size to correspond to ballast 100 (FIG. 1) and base 120 (FIG. 2). To correspond with the ballast 100 (FIG. 1) and the base, holes 220, 222, 224, 226 are each similarly spaced from the two respective nearest sides of the second major surface to lie adjacent respective other holes in the block and/or the base when the mounting is assembled to the block and/or the base.

Channel 240 is about 80 mm wide and about 280 mm long. Blind holes 242, 244 are positioned on a line parallel to the open end of channel 240 and spaced about 30 mm from the closed end of the channel, each blind hole is about 17 mm from the respective nearest side of the rectangular channel. As will be appreciated by the skilled practitioner in the context of the present disclosure, the stated dimensions are merely a particularly advantageous example and other sizes and shapes of mounting are contemplated.

FIGS. 3D-3F show a second mounting 200' which is substantially cuboid in shape and has a first major surface 202' and a second major surface 204' opposite to the first major surface. Holes 220', 222', 224', 226' pass from the first major surface 202' of the mounting 200' to the second major surface 204'. The mouths of the holes 220', 222', 224', 226' are countersunk into the first major surface 202'.

A channel 240' is recessed into the first major surface 202' of the mounting 200'. In the example of FIGS. 3D-3F, the channel 240' is in the shape of an inverted-T, in that it comprises a flat recess 2242, and a narrower neck portion 2241 extending between the recess 2242 and the first major surface 240'. One end of the channel 240' is open to the side of the mounting 200' so that a frame member can be slid into the channel from its open end. The flat recess 2241 is arranged for receiving the frame member (not shown) to attach a solar panel to the mounting 200', and the neck portion 2241 is narrower than the recess which enables a frame member to be slid into the channel from its open end but restrained in the channel by the neck portion 2241.

The channel 240' is about 80 mm wide and about 280 mm long. Blind holes 242, 244 are positioned on a line parallel to the open end of channel 240 and spaced about 30 mm from the closed end of the channel, each blind hole is about 17 mm from the respective nearest side of the rectangular channel. As will be appreciated by the skilled practitioner in the context of the present disclosure, the stated dimensions are merely a particularly advantageous example and other sizes and shapes of mounting are contemplated. The channel 240' need not be T-shaped, and may instead be tapered, or of any form having a narrowed neck portion configured to restrain a frame member in the channel 240'.

Figure 4B:
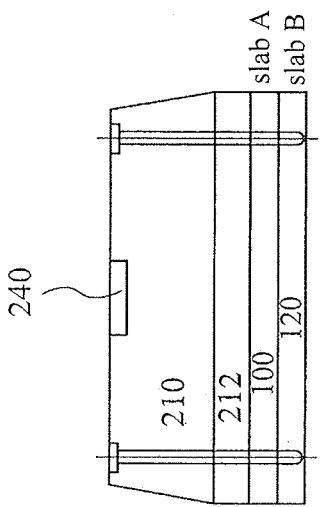
FIGS. 4A, 4B, and 4C show side, end, and top views, respectively, of the mounting of FIGS. 3A, 3B, and 3C assembled to a ballast block of FIGS. 1A, 1B and 1C and the base of FIGS. 2A, 2B and 2C.
Figure 4A:
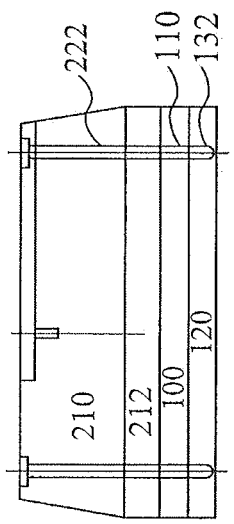
Figure 4C:
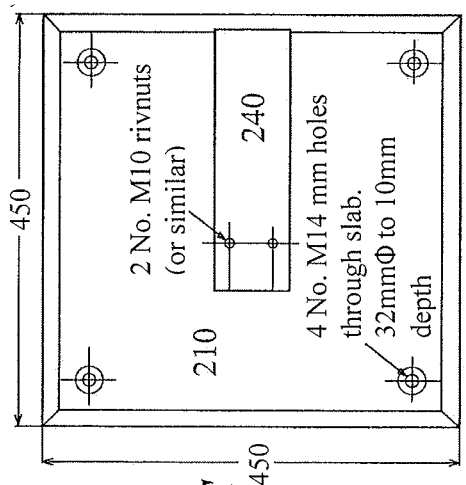

FIGS. 4A-4C show a ballast assembly 300 comprising an anchor 200 assembled to additional ballast 100 and a base 120.

FIG. 5A shows a perspective view of a frame 500 for use with the ballast assembly of FIG. 4 or the anchor 200 of FIG. 3 with or without additional ballast 100 or a base 120.

Frame 500 includes a substantially flat base member 510 and uprights 512, 514 carrying angled mountings 516, 518 having substantially flat faces. Angled mounting 516 has a flange or lip 517 extending across its face. Uprights 512 and 514 extend substantially perpendicularly from base member 510 and upright 512 is shorter than upright 514 so that the angled mountings are substantially coplanar. Holes 520, 522, 524, 526 extend through the base member.

Base member 510 is dimensioned to slot into the rectangular channel 240 of two seats 200 (FIG. 3), or into the inverted T-shaped channel of the seat 200' shown in FIG. 3D. If the seat 200 of FIGS. 3A, 3B, and 3C is used one seat 200 can be arranged at each end of the base member so that the holes 520, 522, 524, 526 marry up with respective ones of the holes 242, 244 in the rectangular channels 240 (FIG. 3).

The angled mountings 516, 518 are both inclined at a substantially similar angle to the vertical to enable them to cooperate to support a flat panel. The mountings 516, 518 both carry a threaded hole to receive a bolt for securing the panel to the frame.

Figure 5B:
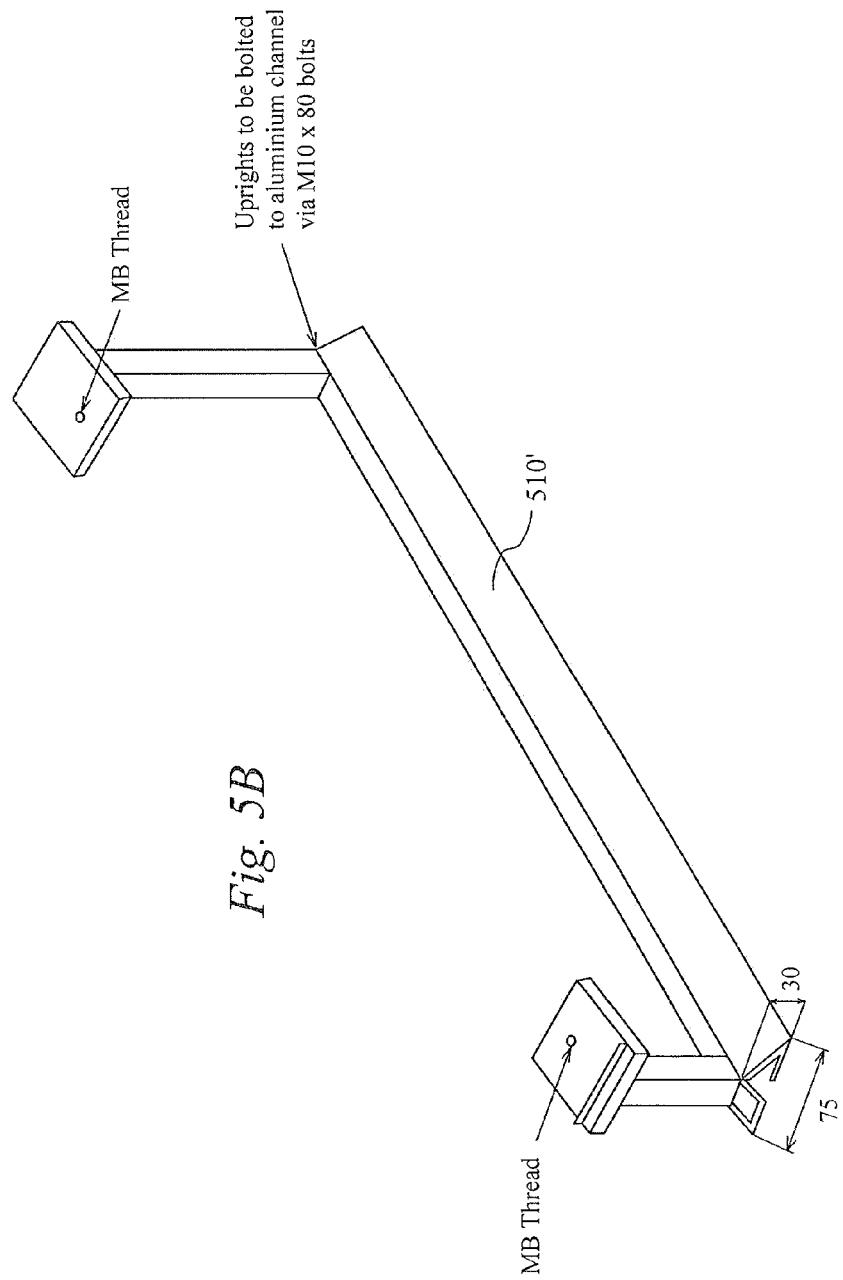
FIG. 5B shows a perspective view of another frame for a solar panel.

FIG. 5B shows a perspective view of an alternative frame 500', in FIGS. 5A and 5B like reference numerals are used to indicate like elements. As will be seen from the Figure the frame 500' comprises a base member 510' having a substantially trapezoidal cross section.

FIG. 6 shows planar views of the frame 500 of FIG. 5A, in particular FIG. 6A shows a side view, FIG. 6B shows a first end view, FIG. 6C shows a bottom view, FIG. 6D shows a second end view and FIG. 6E shows a top down view of frame 500.

FIG. 7 shows views of a substantially wedge shaped anchor 400, in particular FIG. 7A shows a side view, FIG. 7B shows an end view, FIG. 7C shows a top down view and FIG. 7D shows a perspective view of the substantially wedge shaped anchor 400.

Wedge shaped anchor 400 has a flat first major surface 401 and a second major surface 410 which is inclined with respect to the first major surface 401. The upper, inclined, face of the anchor provides an engagement feature so that the anchor provides a mounting. Side faces 411, 412 of the wedge shaped mounting/anchor are shaped like an irregular six sided polygon the sides of which correspond to the faces of the mounting 400. First and second ends 402, 403 extend perpendicularly from first major surface 401. A first inclined end face 404 inclines inwardly from the first end 402 such that the angle between the first end 402 and the first inclined end face is 170°. A second inclined end face 414 inclines inwardly from second end 403 such that the angle between the second end 403 and the second inclined end face 414 is 170°. The second major surface 410 meets the second inclined end face 414 at a right angle and extends, inclined with respect to the first major surface at an angle of 10°, towards the first inclined face 404. A lip 406 protrudes from the second major surface along the line where it meets the first inclined surface 404.

Second major surface 410 carries first and second fixtures 408, 409 which include a pre-threaded recess to receive a bolt (not shown) for fixing a panel to the mounting. Second inclined face 414 carries two rows, 415, 417 of pre-threaded recesses for receiving bolts (not shown). In some possibilities these rows of pre-threaded recesses can be used to secure a cable tray to the wedge. This has the advantage that a solar panel frame can be assembled to the inclined face of the wedge and cables carried safely in the cable tray without the need to provide a separate frame for the solar panel.

Although the second major surface 410 of the anchor/mounting 400 is shown having a 10° angle of incline (with respect to the first major surface) the second major surface may be inclined at various different angles. In some possibilities a mounting kit for a solar panel comprises a plurality of mountings 400 having differently inclined second major surfaces 410. Examples of different inclines include 1°, 2°, 3°, 4° and 5°. In some possibilities the differently inclined mountings 400 are labelled with the respective angles of incline of the second major surface.

In use anchors/mountings 400 are assembled to a panel to provide ballast and to mount the panel at an angle for receiving sunlight. The mounting 400 comprises a recycled rubber.

A plurality of anchors/mountings 400 can be used to provide a ballasted mounting for an array of panels of arbitrary size without the need for a frame, such as frame 500. Mountings 400 can be arranged on a roof to provide a base to which solar panels can be fixed and, with the addition of further fixtures similar to 408 and 409 on the second major surface 410, a mounting 400 can be secured to the edges of two solar panels at the join between the panels to secure the panels together and to ballast and reinforce the array of panels at what would otherwise be its weakest point.

Mounting 400 (or mounting 200 shown in FIG. 3) may include handholds in the form of recesses arranged on the edges of the blocks to enable the mountings to be more easily manipulated.

In use, a technician positions a plurality of anchors (200 in FIG. 3, 400 in FIG. 7) on a roof and adjusts their position on the roof to suit the solar panel which is to be installed. Once the approximate position of the anchors has been determined shims and/or additional ballast (such as, for example ballast 100 in FIG. 1 or base member 120 in FIG. 2 or some other shim or ballast having non parallel faces). The anchors, shims and/or ballast can be arranged without bonding or fixing the structure together to allow subsequent adjustments once the solar panel or frame is in position. Once the solar panel and/or solar panel frame has been assembled to the anchors the anchor can be secured to the ballast and/or shims to fix the structure in place. Alternatively, if required, shims can be added or removed to adjust the structure before it is secured together.

FIG. 8 shows a side view of another kind of block 10 having a face 12 carrying a dovetail feature 14 and a recess 16 for receiving a bar of a solar panel frame. The dovetail feature 16 extends substantially along the extent of one dimension of the block (shown vertically in FIG. 7) so that the blocks can be slotted into place adjacent (rather than on top of) each other during assembly. One end of the dovetail feature 14 meets the recess 16 so that when a bar is placed in the recess it will extend through the dovetail feature and the dovetail features and the bar will both act to hold the blocks together.

FIGS. 9A to 9D show cross sections (taken along the line 2 in FIG. 8) of block 10 according to FIG. 8, and of three variations (22, 24, and 26) thereof. Block 10 may include a dovetail protrusion 18 and a dovetail recess 20. Block 22 includes two dovetail recesses 20, 20' and other blocks 24 include two dovetail protrusions 18, 18'. Block 26 comprises a substantially cuboid body 26' and first and second limbs 28, 29 extending from the body at diagonally opposite corners and substantially perpendicular to respective opposite faces 12, 12'. Limbs 28, 29 carry trapezoidal members 30, 30' which define trapezoidal gaps 32, 32' arranged so that when two such blocks are assembled together a trapezoidal member 30 extends into a trapezoidal gap 32 to couple the blocks together. Dashed lines indicate the position of recess 16, which is not in the plane of the drawings of FIGS. 9A-9D.

Figure 10:
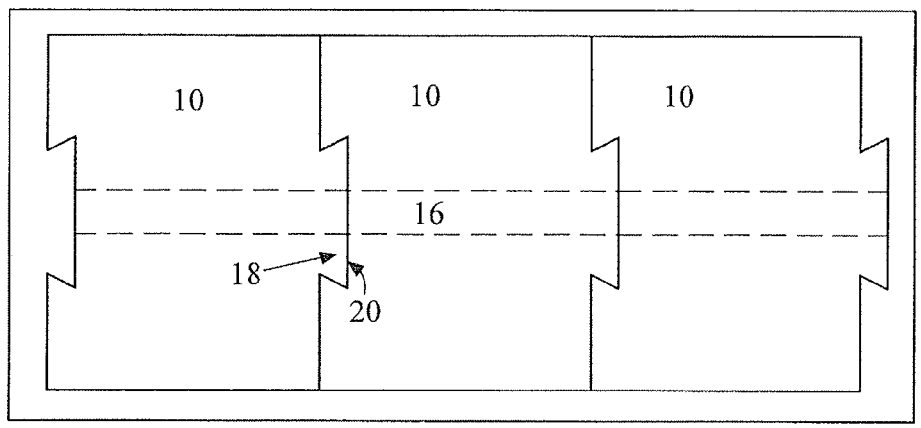
FIG. 10 shows a top and side view of an anchor with a base.

FIG. 10 shows a top view of a plurality of blocks 10 coupled together by dovetail elements 18, 20 and a bar 34 seated in recess 16 to form an anchor. The blocks 10 are mounted on a base by base couplings (not shown in the drawing) which cooperate with a corresponding one of a plurality of fittings 46 (see FIG. 10) carried on the base to hold the anchor together.

Figure 11:
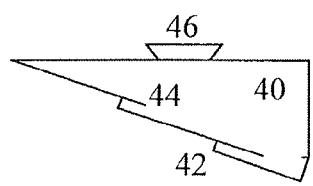
FIG. 11 shows a wedge shaped base adapted for use on a tiled roof.

FIG. 11 shows a side view of a wedge shaped rubber base for stabilising the blocks on a sloping tiled roof. Base 40 comprises terraces 42 which extend along a first face 45 adapted to cooperate with a tiled roof the thickness of the terraces is selected to match standard roofing tile sizes. Perforate or partially cut sections 44 are provided parallel with the first face 45 on each terrace to enable the extent of the terraces to be adjusted using a box-cutter or craft knife. The second face 47 carries a dovetail protrusion 46 for coupling the base to a block 10 (not shown in FIG. 11).

Figure 12:
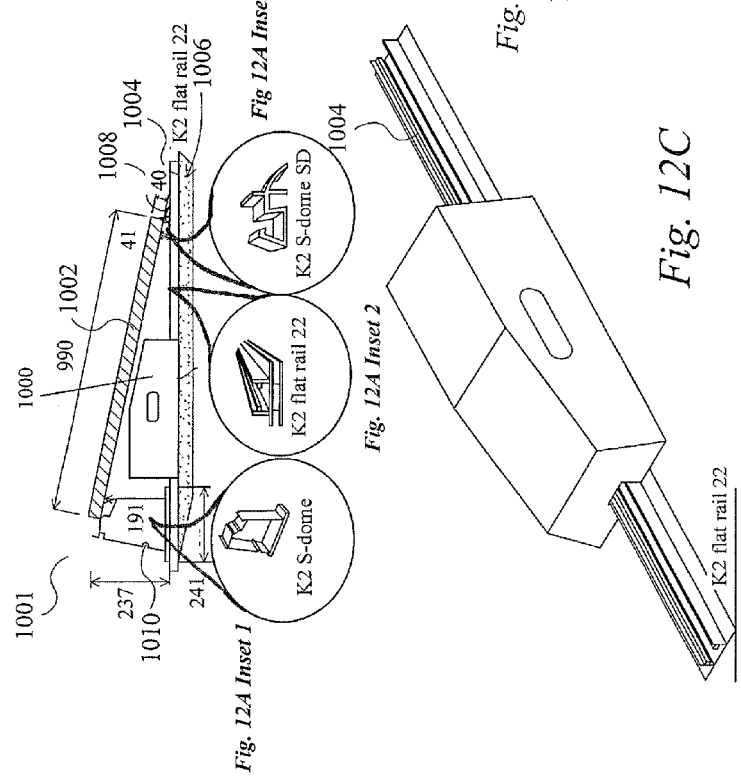
FIGS. 12A to 12D show a series of views of a ballasted assembly for anchoring a solar panel.

FIG. 12A shows a diagram of an apparatus 1001 comprising a solar panel 1002, and a mounting anchor 1000. A first frame member 1004 lies flat on a surface 1006, and FIGS. 12B (including 12B-1 and 12B-2) to 12D (including 12D-1 to 12D-5) show various enlarged and cross-sectional views of mounting anchor 1000. Coupled transverse to the first frame member 1004 is a second frame member 1008, and a third frame member 1010. The solar panel 1002 is coupled to the second frame member 1008 and the third frame member 1010, and the second and third frame members are arranged to support the solar panel at a selected incline angle with respect to the first frame member 1004 (and the surface 1006).

The mounting anchor 1000 comprises integral ballast and a channel on its foot or base, which lies along the base of the anchor to enable the anchor 1000 to be seated over the first frame member 1004 so that, in use, the first frame member 1004 is held to the surface 1006 by the weight of the anchor 1000. The first frame member 1004 of FIG. 12 may comprise a flat foot which is wider than the channel 1012 to enable the anchor 1000 to more securely restrain the first frame member 1004. The anchor 1014 may further comprise recesses 1014 on the sides of the anchor 1000 to provide handholds to enable the anchor 1000 to be manipulated by a user.

FIGS. 13A-13C show an apparatus comprising a plurality of solar panel mounting anchors 2200, and a first solar panel 2201 coupled to a first one of the solar panel mounting anchors. As shown in FIGS. 13A-13C, a second solar panel 2202 is coupled to a second solar panel mounting anchor of the plurality of solar panel mounting anchors 2200. The second solar panel is spaced horizontally from the first solar panel by a first distance selected based on the first incline angle and the length of the solar panel 2201.

Figure 13:
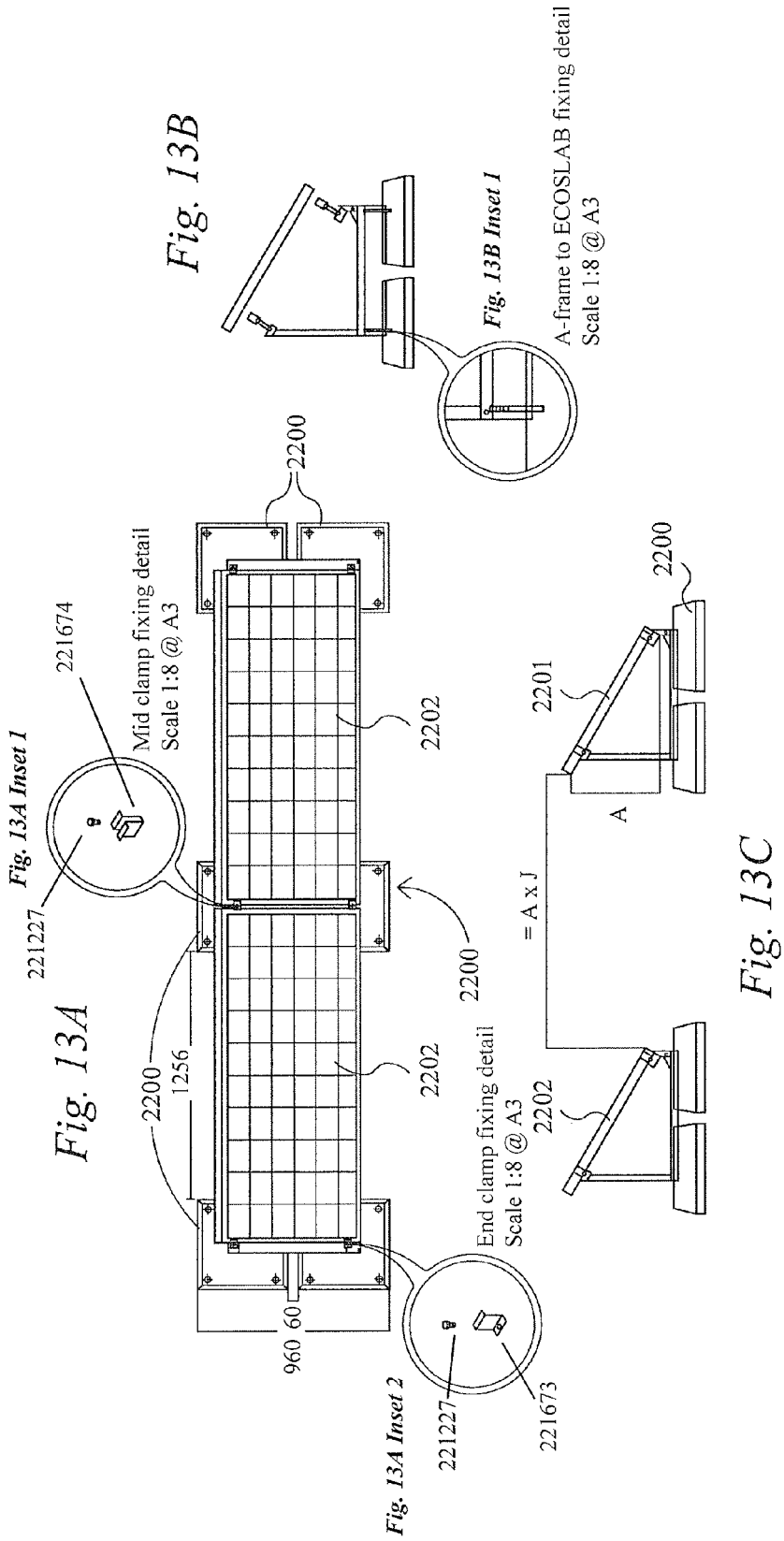
FIGS. 13A to 13C show a series of views of another ballasted assembly for anchoring a solar panel.
Figure 14:
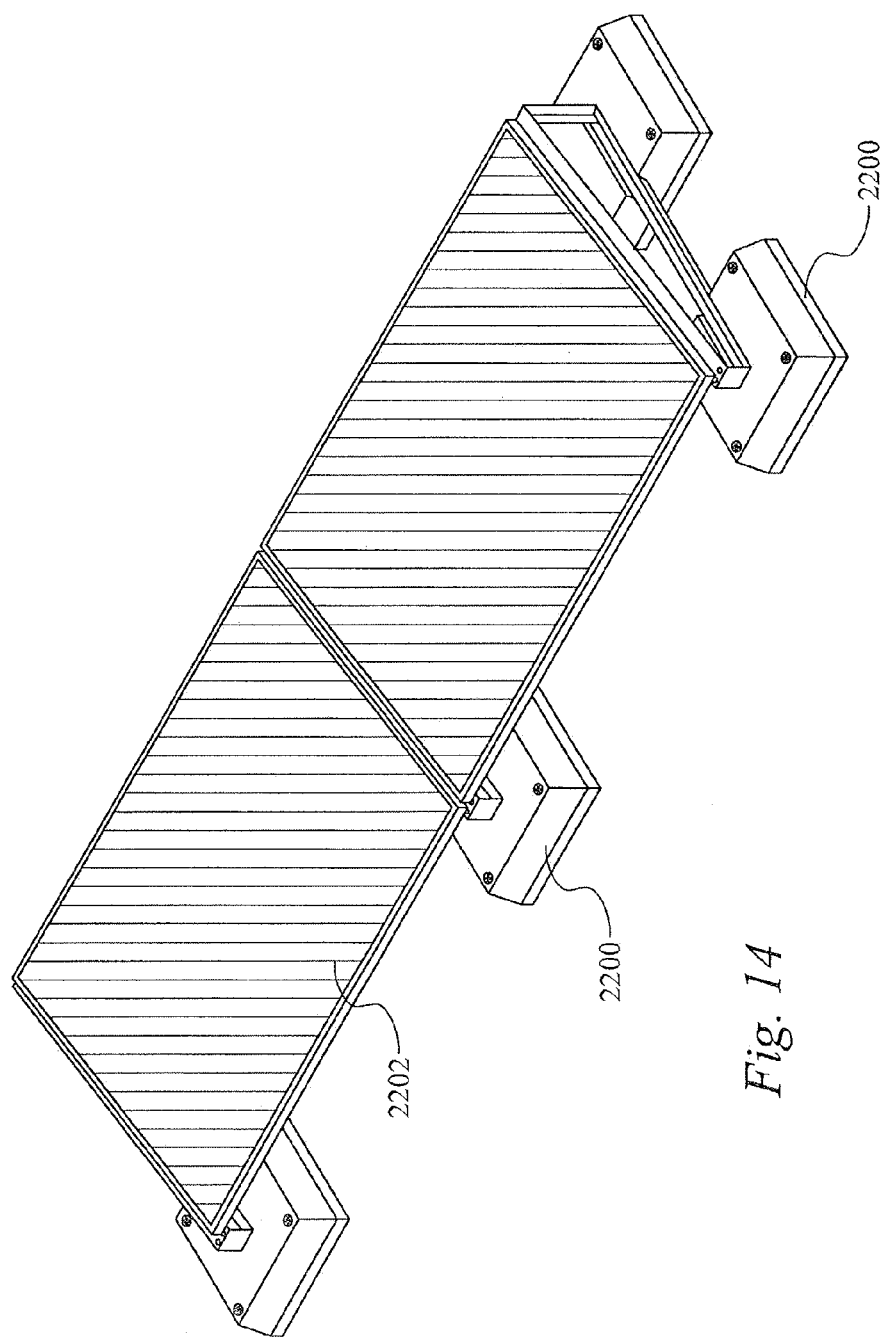
FIG. 14 shows an elevation view of the assembly of FIG. 13.

FIG. 14 shows a perspective view of part of the apparatus shown in FIG. 13.

FIG. 15 shows a substantially wedge shaped solar panel mounting anchor 3000. The anchor 3000 comprises a first ballast body 3004, which in FIG. 15 is provided by a substantially flat slab, comprising a support surface for supporting a second ballast body 3006. The first ballast body 3004, and the second ballast body 3006 may each comprise recesses 3015 to provide handholds for manipulating the ballast.

Figure 15A:
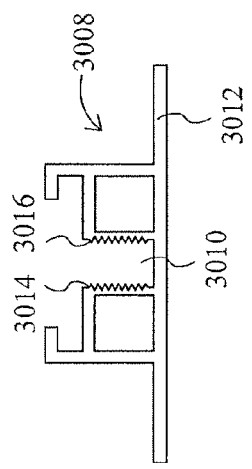
FIGS. 15A to 15C show an elevation view of a solar panel mounting anchor, with inset views of two types of components for the anchor.
Figure 15B:
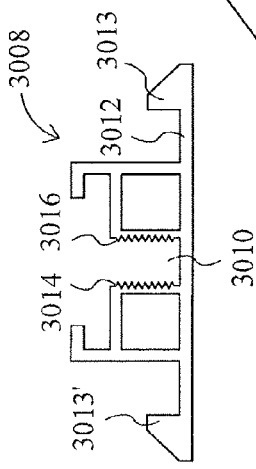
Figure 15C:
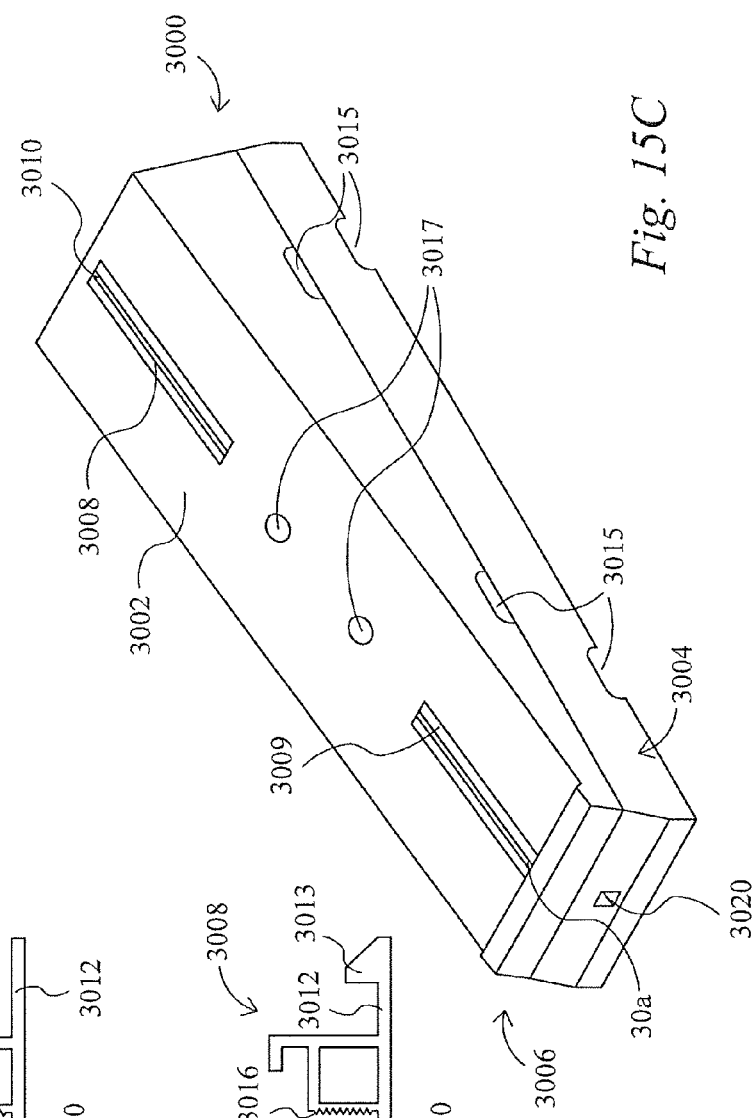
Figure 18A:
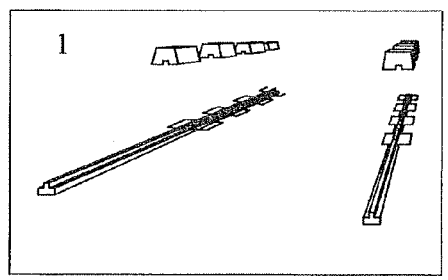
FIGS. 18A to 18D show a series of perspective views illustrating a method of assembling the apparatus of FIGS. 12A to 12D; and, FIGS. 19A to 19E show a series of perspective views illustrating a method of assembling a ballasted assembly for anchoring a solar panel comprising anchors as shown in FIGS. 15A to 15C.
Figure 18B:
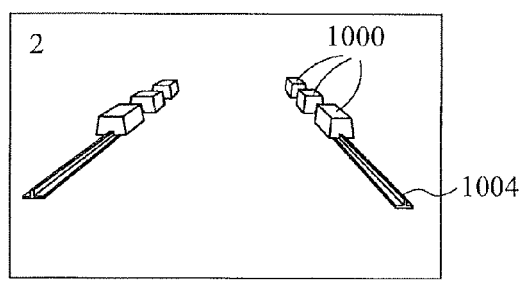
Figure 18C:
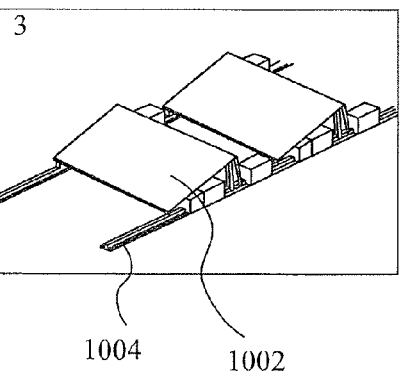
Figure 18D:
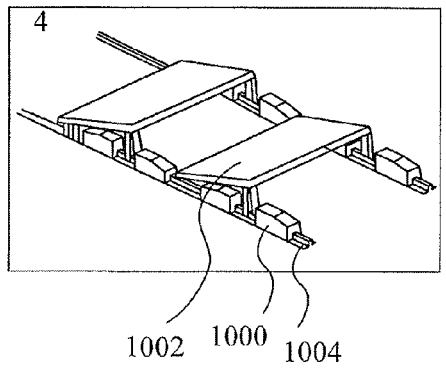
Figure 19A:
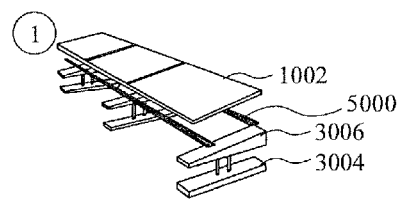
Figure 19B:
Figure 19C:
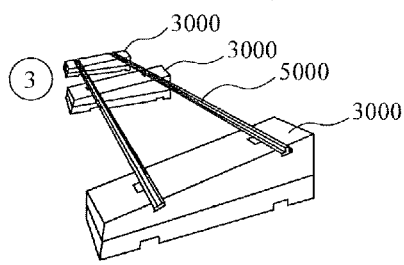
Figure 19D:
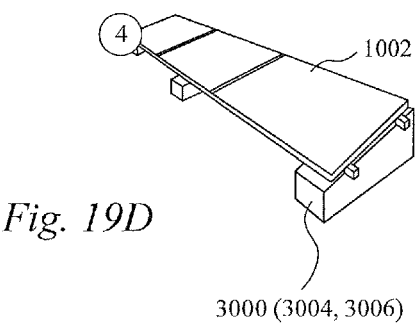
Figure 19E:
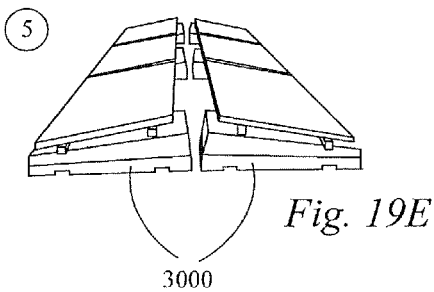

In FIGS. 15A to 15C, the second ballast body 3006 is made substantially of a resilient material and comprises an inclined support surface 3002 for supporting a solar panel. The inclined support surface 3002 may carry through holes 3017 which pass through the second ballast body 3006 to enable it to be fixed to the first ballast body 3004. The inclined support surface 3002 may also carry two rigid members 3008, 3009. Inset A and Inset B illustrate a cross sections through two example rigid members 3008.

In FIGS. 15A to 15C, each rigid member 3008, 3009 comprises a groove 3010, 3011. The grooves 3010, 3011 comprise an elongate groove defined by two internal sidewalls 3014, 3016 as illustrated in Inset A, and Inset B. The internal side walls 3010, 3011 of the groove 3010 may comprise elongate ridges extending along the side walls. The ridges on two side walls are substantially parallel. The ridges on the first side wall 3014 and may be vertically offset (e.g. in the direction of the depth of the groove) with respect to the ridges on the second side wall 3016. The ridges may enable a fixture such as a threaded bolt to secure a solar panel, or a rail for a solar panel to the ballast. In some examples the ridges are omitted, and other types of fixtures may be used, for example self-tapping screws, or clips which operate on an interference fit.

In FIGS. 15A to 15C, the groove 3010 of the rigid member 3008 is pictured as running up the inclined surface 3002, but it may also run across the inclined surface 3002. The groove 3010 is adapted to receive a fixture for securing a solar panel to the ballast, and is able to receive a fixture in a range of positions along the length of the groove length. In FIGS. 15A to 15C the anchor comprises two rigid members 3008, each having a groove 3010, however in some cases a single rigid member 3008, or more than two rigid members 3008 may be provided on the support surface of the anchor 3000.

In the example of FIGS. 15A to 15C the rigid member 3008 is substantially embedded in the ballast body 3006. The rigid member 3008 comprises a foot 3012 which protrudes outwardly from the groove 3010, transverse to the depth and length of the groove, and into the ballast body 3006. Such a protrusion may not be needed, and although the foot 3012 of Inset A and Inset B is disposed near a base of the groove 3010 this is optional. In Inset B of FIGS. 15A to 15C, the foot 3012 carries a lip 3013, 3013' spaced from a side wall 3014, 3016 of the groove 3010, extending upwardly from the foot in the direction of the depth of the groove 3010. When the rigid member 3008 is embedded or molded into the ballast body 3002.

As also shown in FIGS. 15A to 15C, the anchor 3000 may comprise a slot 3020 on a side wall of the first ballast body 3004. The slot 3020 may be arranged on a side wall that is transverse to the direction of the grooves 3010 of the rigid members 3008. The slot 3010 may be arranged to receive a spacing bar (not shown in the drawings) to enable a plurality of anchors, such as the anchor 3000, to be quickly and accurately laid out, and/or fixed in place using the spacing bars, with a fixed spacing between them.

FIGS. 16A to 16D) show a diagram of a substantially wedge shaped ballast body which may be used to provide a second ballast body 3006 for use in the embodiment shown in FIGS. 15A to 15C. As shown in FIGS. 16A to 16D the base surface of the second ballast body 3006, comprises a keying feature 4001 adapted to cooperate with a complementary keying feature 4002 (see FIGS. 17A to 17D) of the mutually align the first ballast body with a first ballast body 3004.

The first ballast body 3004 and/or the second ballast body 3006 may be made substantially of a resilient material, such as rubber, which may comprise crumbed or recycled rubber.

In FIGS. 17A to 17D the first ballast body 3004 comprises a rigid member 4004, in the bulk of the body 3004. The rigid member 4004 of the first ballast body 3004 is shown in more detail in Inset A of FIGS. 17A to 17D, as shown the rigid member 4004 may be planar, and may be cross shaped. The rigid member 4004 may comprise holes 4006 to receive a fixture for coupling the first ballast body 3004 to a second ballast body 3006 (c.f. FIG. 5). The holes 4006 may be threaded to receive a threaded fixture such as a bolt.

As shown in FIGS. 15A to 15C, the second ballast body 3006 may comprise holes 3017 arranged to direct the fixtures into engagement with the holes 4006 of the rigid member 4004.

FIGS. 18A to 18D shows a very schematic view of one embodiment of assembling a plurality of anchors, 1000, similar to the anchors described above with reference to FIG. 12 to a rail 1004. As shown in FIGS. 18A to 18D, the anchors 1000 may be configured to secure the rail 1004 to a surface without being fixed to the rail, for example, the anchors 1000 comprise a groove on the foot of the anchor for straddling the rail. As shown, plurality of anchors 1000 may be distributed along a rail 1004 to enable a plurality of solar panels 1002 to be secured to the rail.

FIGS. 19A to 19E shows a very schematic view of a second embodiment of assembling a plurality of anchors 3000, such as the anchor 3000 shown in FIGS. 15A to 15C to a frame member 5000. As shown in FIGS. 19A to 19E, each anchor 3000 may comprise a first ballast body 3004 and a second ballast body 3006, as described above with reference to FIGS. 15, 16, and 17. As illustrated the first ballast bodies may be arranged on a surface 3004, and the slots 3020 (c.f. FIGS. 15A to 15C) may be used to space the first ballast bodies out on the roof using spacer bars (not shown). The second ballast bodies 3006 may then be fixed to the first ballast bodies 3004 and secured using fixtures (e.g. bolts) which pass through the second ballast body 3006 and into the first ballast body 3004 to engage with the planar rigid member (4004 in FIGS. 16A to 16D) of the first ballast body 3004. Once the anchors 3000 have been assembled frame members 5000 can be secured to the grooved rigid members 3008 on the inclined support surfaces 3002 of the anchors 3000 so that solar panels 1002 can be secured to the frame member 5000.

Other examples and variations of the invention will be apparent to the skilled reader in the context of the present disclosure.

What is claimed is:

1. A solar panel mounting anchor adapted for mounting a solar panel on a flat roof, the anchor comprising integral ballast, edges comprising a resilient material and at least one engagement feature adapted to receive a solar panel and to space the panel from said roof, and a base adapted to inhibit slipping of the anchor on said roof, wherein the ballast comprises an inclined support surface and carries the engagement feature, the engagement feature comprising a rigid member having a groove adapted to receive a fixture for securing a solar panel to the ballast, and the rigid member is substantially embedded in the ballast.

2. The solar panel anchor of claim 1 wherein the groove is elongate and has a length to enable said fixture to secure said solar panel to the ballast at one of a range of positions along the length of the groove.

3. The solar panel anchor of claim 2 wherein the rigid member comprises a first side wall extending along a first side of the elongate groove, and a second side wall extending along a second side of the elongate groove, wherein the first side wall is opposite to the second side wall and the first and second sidewalls extend to a depth thereby to define the groove and wherein the first side wall and the second side wall comprise elongate ridges extending along at least a portion of the elongate groove.

4. The solar panel anchor of claim 3 in which the ridges on the first side wall, and the ridges on the second side wall are substantially aligned with each other and offset in a depth direction.

5. The solar panel anchor of claim 1, wherein the ballast comprises:

a first ballast body comprising a support surface for supporting a second ballast body;

a second ballast body comprising the inclined support surface for supporting a solar panel, and a base surface opposite to the inclined support surface adapted to be supported on the support surface of the first ballast body.

6. The solar panel anchor of claim 5 wherein at least one of the support surface of the first ballast body and the base surface of the second ballast body, comprises a keying feature adapted to mutually align the first ballast body with the second ballast body.

7. The solar panel anchor of claim 5 wherein the first ballast body is made substantially of a resilient material and comprises a rigid member, the second ballast body comprises holes for receiving fixtures to secure the first ballast body to the second ballast body, and the holes are arranged to direct the fixtures into engagement with the rigid member.

8. The solar panel anchor of claim 1 in which the engagement feature comprises a channel for receiving a frame member of a solar panel support frame, wherein the channel comprises an elongate opening on a surface of the ballast, and an interior portion within the ballast, wherein the interior portion of the channel is wider than the opening.

9. The solar panel anchor of claim 1 comprising recesses arranged to provide handholds to enable a user to manipulate the anchor.

10. The solar panel anchor of claim 1 wherein the anchor is made substantially of crumbed rubber.

11. An apparatus comprising:

a plurality of solar panel mounting anchors according to claim 1;

a first solar panel coupled to a first solar panel mounting anchor of the plurality of solar panel mounting anchors and disposed at a first incline angle;

a second solar panel coupled to a second solar panel mounting anchor of the plurality of solar panel mounting anchors, wherein the second solar panel is spaced from the first solar panel by a first distance, wherein the first distance is selected based on the first incline angle.

12. The apparatus of claim 11 in which the second solar panel is disposed at a second incline angle, and the second incline angle is selected based on the first distance and the first incline angle.

13. A solar panel mounting anchor adapted for mounting a solar panel on a flat roof, the anchor comprising integral ballast, and edges comprising a resilient material and at least one engagement feature adapted to receive a solar panel and to space the panel from said roof, and a base adapted to inhibit slipping of the anchor on said roof, wherein:

the ballast comprises an inclined support surface carrying the engagement feature, the engagement feature comprising a rigid member having a groove adapted to receive a fixture for securing a solar panel to the ballast, the groove has a depth, and the rigid member comprises a protrusion which extends outwardly from the groove transverse to the depth of the groove and into the ballast.

14. The solar panel anchor of claim 13 in which the protrusion is disposed near a base of the groove.

15. The solar panel anchor of claim 13 in which the protrusion carries a ridge, spaced from a side wall of the groove which extends towards the support surface.

* * * * *